Nov. 6, 1962 W. A. HUNTER 3,062,389
FLASK AND MOLD HANDLING MECHANISM
Filed June 15, 1960 3 Sheets-Sheet 1

INVENTOR.
WILLIAM A. HUNTER
BY
ATTY.

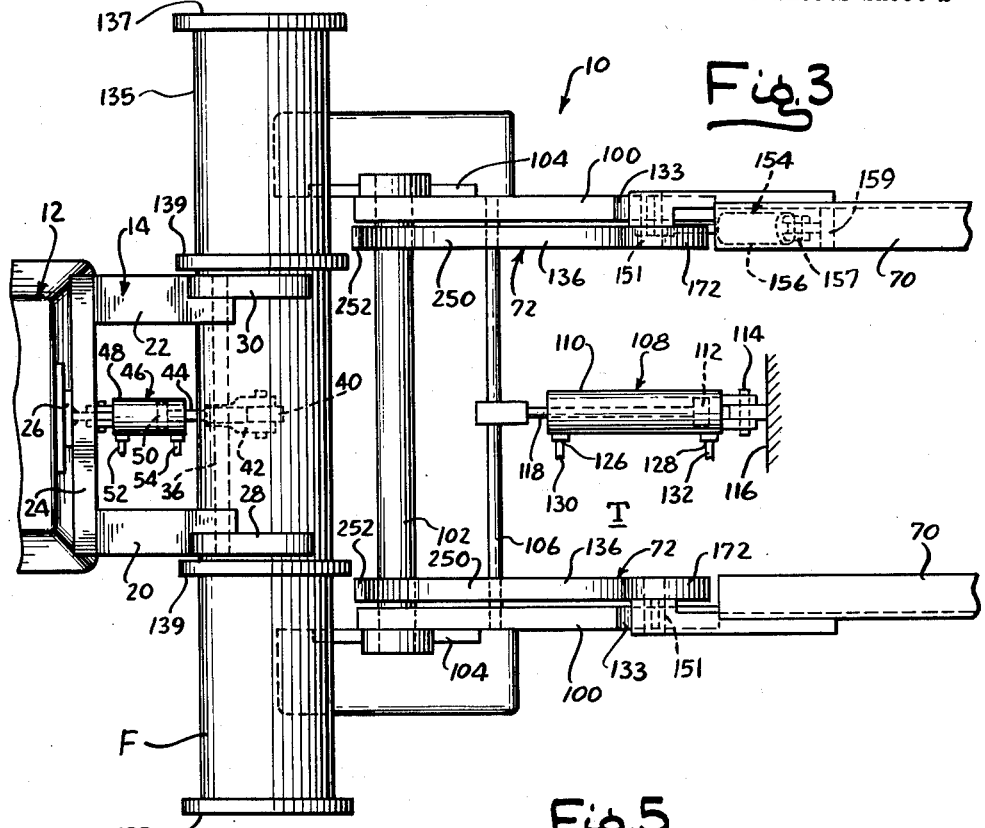
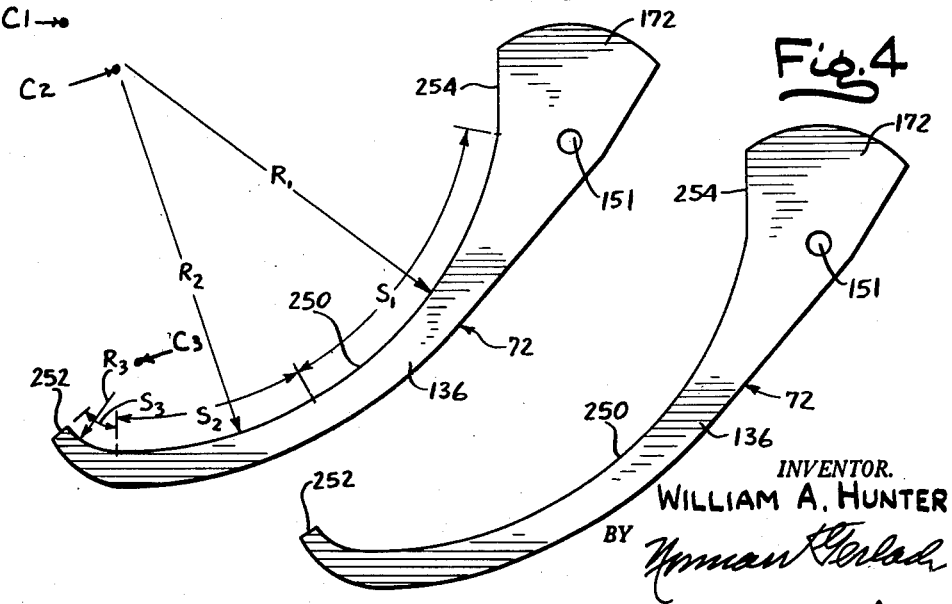

Nov. 6, 1962 W. A. HUNTER 3,062,389
FLASK AND MOLD HANDLING MECHANISM
Filed June 15, 1960 3 Sheets-Sheet 3
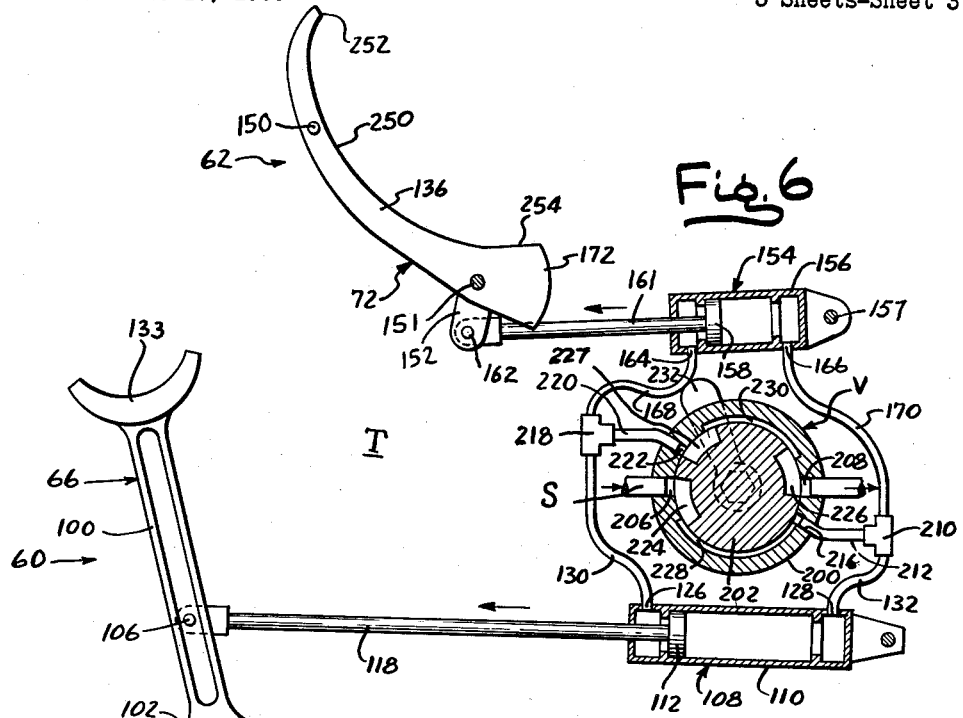
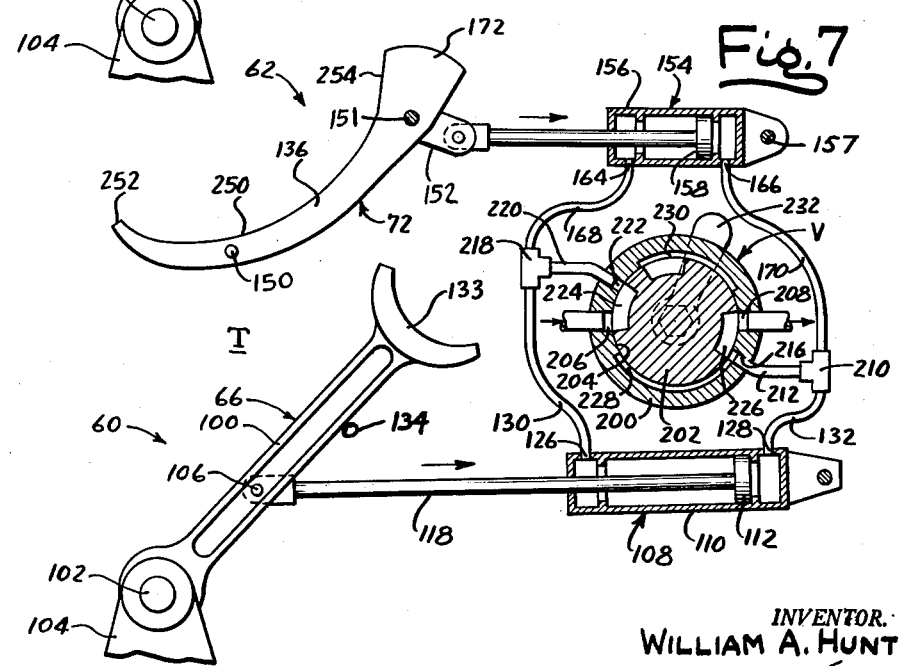
INVENTOR.
WILLIAM A. HUNTER
BY
ATTY.

United States Patent Office 3,062,389
Patented Nov. 6, 1962

3,062,389
FLASK AND MOLD HANDLING MECHANISM
William A. Hunter, Morton Grove, Ill., assignor to Petti-
bone Mulliken Corporation, a corporation of Delaware
Filed June 15, 1960, Ser. No. 36,275
2 Claims. (Cl. 214—1)

The present invention relates to flask and mold handling mechanism, and has particular reference to such a mechanism, whereby flasks and molds which are to be employed in connection with the centrifugal casting of metal articles, such as pipe sections or the like, are transported to and from the scene of molding operations respectively.

The improved flask and mold handling mechanism of the present invention has been designed for use primarily in connection with the transportation of empty cylindrical flasks from a shakeout station to a transfer station where they are delivered in a horizontal position to the flask-receiving jaws of a transfer and upending mechanism which conducts them to a ramming station, as well as in connection with the transportation of flasks with the filled molds therein from such transfer station to a remote spinning and pouring station where the metal pipe castings are produced by known centrifugal casting operations. The invention is, however, capable of other uses and handling mechanism constructed in accordance with the principles of the present invention, may, if desired, be employed with or without modification in the delivery and withdrawal of all manner of cylindrical articles to and from a given location respectively. Irrespective, however, of the particular use to which the invention may be put, the essential features thereof are at all times preserved.

When put to the use briefly outlined above, the flask and mold handling mechanism of the present invention may assume the form of an assembly of parts which constitutes a portion of the apparatus shown and described in my copending application Serial No. 15,285, filed on March 16, 1960, and entitled "Method of and Apparatus for Producing Sand Molds." The invention has been illustrated herein for exemplary purposes as being associated with such an apparatus and the present application is a continuation-in-part of such copending application.

Briefly, in the above-mentioned copending application, the apparatus disclosed embodies a transfer and upending mechanism which is positioned between a transfer station and a ramming station. The upending mechanism receives empty cylindrical flasks in a horizontal position and transfers them to the ramming station. During the transfer, the flasks are upended so that they are delivered at the ramming station in a vertical position and in register with a spinning table and with certain inner core and base patterns maintained at the ramming station to facilitate the ramming operation. The transfer and upending mechanism also operates to receive the filled flasks, i.e., the flasks with the completed molds therein, in a vertical position and to return them to the transfer station. During this latter transfer operation, the flasks with the molds therein are restored to a horizontal position prior to delivery thereof at the transfer station. The conduction of empty flasks in one direction from the transfer station to the ramming station and the conduction of the filled flasks with the molds therein in the other direction from the ramming station back to the transfer station is carried out simultaneously.

In the herein illustrated embodiment of the flask and mold handling mechanism, novel means are provided, first, for transporting empty flasks from a remote location, which may be a shakeout station, to the transfer station and the delivery of such flasks in a horizontal position to the upending mechanism, and, secondly, for receiving the filled flasks from the upending mechanism at the transfer station in a horizontal position and transporting such filled flasks to another remote location, which may be a spinning and pouring station.

It is among the principal objects of the present invention, in an apparatus of the character briefly outlined above, to provide a gravity-feed flask-transporting mechanism for the delivery of flasks successively at a given location with their axes extending horizontally, such mechanism having associated therewith novel means for effecting cushioned deceleration of the flasks as they approach the point of delivery so that each individual flask will be delivered with a predetermined terminal velocity.

A similar and related object of the invention is to provide such a cushioning means wherein, by simple manual adjustment, the terminal velocity of the flasks undergoing delivery may be regulably controlled.

It is another object of the invention to provide such a flask-transporting mechanism wherein the flasks are subjected to a rolling action on a rail-equipped ramp under the influence of gravity during their transportation, and wherein there is provided adjacent the lower or delivery end of the ramp a novel form of discharge gate structure which serves the dual functions of, first, periodically releasing the foremost flask on the ramp for delivery at the desired location while simultaneously arresting movement of the penultimate flask, and, secondly, effecting the cushioned deceleration of the released flasks as set forth above.

A still further object of the invention, in an apparatus of the character briefly outlined above, is to provide a dual system of flask and mold transportation for delivery of empty flasks to a flask upending turret and for unloading of mold-containing flasks from the upending turret, together with means for correlating the movements of the mechanisms involved so that there will be no interference between the movements of the empty flasks and the mold-containing flasks or between the mechanisms employed for the handling of such flasks.

With these and other objects in view, which will become more readily apparent as the following description ensues, the invention consists of the novel construction, combination, and arrangement of parts shown in the accompanying three sheets of drawings forming a part of this specification.

In these drawings:

FIG. 3 is a top plan view of the structure shown in FIG. 1;

FIG. 4 is an enlarged side elevational view, somewhat schematic in its representation, of a tail gate and flask cushioning structure employed in connection with the present invention;

FIG. 5 is a schematic view similar to FIG. 4 showing a modified form of tail gate structure;

Figure 1:
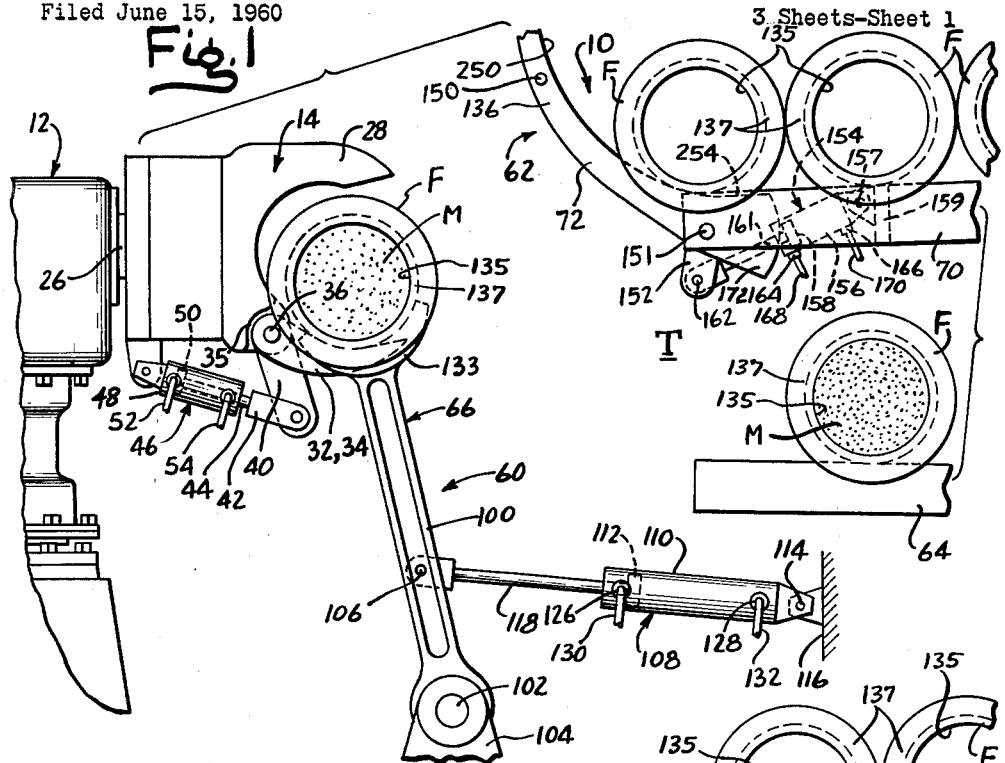
FIG. 1 is a fragmentary side elevational view of a flask and mold handling mechanism constructed in accordance with the principles of the present invention and showing the same operatively associated with one of the upending jaw structures of a flask and mold transfer turret.
Figure 2:
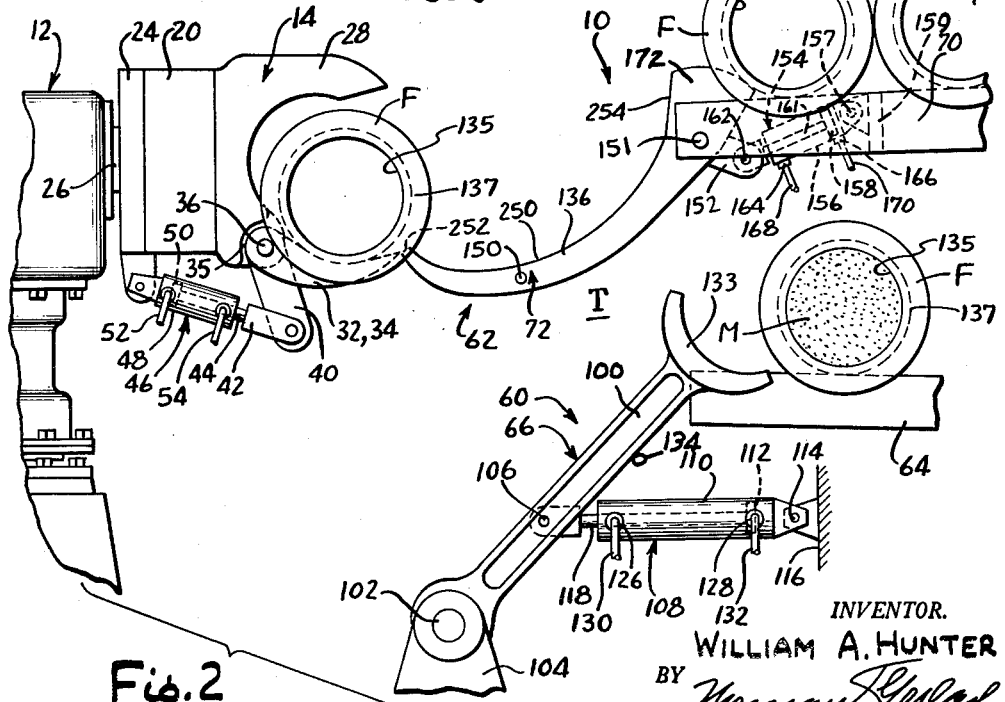
FIG. 2 is a fragmentary side elevational view similar to FIG. 1 showing the parts in a different position.

FIG. 6 is a schematic view showing certain hydraulic control circuitry associated with the flask and mold handling mechanism, and showing the same in the condition which it assumes for positioning of the parts in accordance with the disclosure of FIG. 1; and FIG. 7 is a schematic view similar to FIG. 6 showing the circuitry in the condition which it assumes for positioning of the parts in accordance with the disclosure of FIG. 2.

Referring now to the drawings in detail, and in particular to FIGS. 1 to 3, inclusive, the flask and mold handling mechanism which forms the subject matter of the present application has been designated in its entirety at 10. It is shown as being operatively disposed in a foundry installation such as has been shown and described in my copending application Serial No. 15,285, mentioned above. On such portions of the foundry installation as are pertinent to the flask and mold handling mechanism of the present invention have been illustrated herein. The illustrated portion of the foundry installation consists of a fragmentary view of a flask-upending turret assembly 12 having a pair of diametrically disposed flask transporting jaw assemblies or heads 14, only one of which has been illustrated herein. The turret assembly 12 is disposed between a transfer station T and a ramming station (not shown) and the jaw assemblies 14 are adapted to receive empty flasks at the transfer station T in a horizontal condition and to transport them to the ramming station upon rotation of the turret assembly through an angle of 180° while at the same time upending the flasks by rotation of the jaw assemblies about their horizontal axes so that the flasks will be delivered to the spinning table at the ramming station in a vertical condition. As each jaw assembly 14 moves with its empty flask from the transfer station T to the ramming station, the other jaw, which has received therein a filled flask containing a rammed mold, moves from the ramming station toward the transfer station while at the same time operating to decline the flask so that it is finally delivered at the transfer station T in a horizontal condition.

For a full disclosure and understanding of the manner in which the turret assembly 12 operates to transport empty flasks from the transfer station to the ramming station, and to transport mold-containing flasks from the ramming station to the transfer station, reference may be had to my copending application above referred to. For purposes of disclosure herein and to facilitate an understanding of the relationship between the turret assembly 12 and the mold and flask handling mechanism 10, it is deemed sufficient to point out that each jaw assembly 14 is in the form of a jaw cradle of generally U-shape configuration in longitudinal cross section as best seen in FIG. 3. Each assembly includes a pair of parallel side plates 20 and 22 and a connecting web plate 24. The web plate 24 is mounted on the projecting end of a horizontally extending jaw-supporting shaft 26, which, when the jaw assembly is disposed at the transfer station T, serves to maintain the plate 24 in such position that the side plates 20 and 22 are horizontally aligned, and which, when the jaw assembly is disposed at the ramming station, serves to maintain the plate 24 in such position that the side plates 20 and 22 are vertically aligned.

The side plates 20 and 22 are formed with forwardly extending fixed jaw fingers 28 and 30 which project forwardly from one longitudinal edge of the side plate, the two fingers extending in parallelism and constituting, in effect, a composite fixed jaw which is disposed by a movable jaw consisting of a pair of pivoted flask-clamping jaw fingers 32 and 34, respectively. These latter jaw fingers have their base or proximate ends seated within recesses 35 provided in the respective side plates 20 and 22 and are rigidly connected together by a transverse operating shaft 36. The ends of the operating shaft 36 are rotatably mounted in the two side plates 20 and 22, respectively. The connecting and operating shaft 36 has fixedly secured thereto in the medial regions thereof a torque arm 40, the distal end of which is adjustably and pivotally connected by a yoke 42 carried by a piston rod 44 associated with a piston and cylinder assembly 46. The piston rod 44 extends into a cylinder 48 and carries a piston 50 which is reciprocable in the cylinder 48. The cylinder 48 is provided with fluid ports 52 and 54 which may be operatively connected by flexible fluid lines to a suitable control valve (not shown), by means of which motive fluid may selectively be directed to the piston and cylinder assembly for operation thereof to produce jaw opening and closing movements at appropriate times in the machine cycle.

The inner opposed surfaces of the jaw fingers 32 are curved to conform to the cylindrical outer surfaces of the flasks undergoing transfer in opposite directions between the ramming station and the transfer station. Thus, it will be seen that upon selective application of motive fluid to the opposite ends of the cylinder 48 through the ports 52 and 54, rocking motion will be imparted to the pivoted jaw fingers 32 and 34 for jaw-opening and jaw-closing purposes for flask-engaging and flask-releasing purposes, as will be described in detail presently.

The arrangement of parts thus far described forms no part of the present invention, it forming the subject matter of my copending application above referred to, and it being disclosed herein as an exemplary environment for the flask and mold handing mechanism 10 which will now be described in detail and subsequently claimed. The mechanism 10 is in the form of a flask take-off and delivry mechanism including a set of flask take-off instrumentalities 60 and a set of flask delivery instrumentalities 62, the former being designed to receive rammed mold-containing flasks from the jaw assemblies 12 at the transfer station T in a horizontal position and to transport the same by a rolling action under the influence of gravity to a remote location, as, for example, a remote spinning and pouring station. The flask delivery instrumentalities 62 are designed to receive empty flasks at a remote location such as a shakeout station and to transport the same to the transfer station T and deliver them to the jaw assemblies 12.

Briefly, the flask take-off instrumentalities 60 include a pair of rails 64 which extend between the transfer station T and the remote location where the filled flasks are to be delivered and which may be a pouring and spinning station, together with a transfer carriage 66 which is movable in opposite directions between the turret 12 and the rails 64 for reception of the flasks one at a time and delivery thereof to the rails. The flask delivery instrumentalities 62 include a pair of rails 70 which extend between a remote location, such as a shakeout station and the transfer station T, and a gate structure 72 by means of which flasks proceeding from the remote location to the transfer station are initially arrested in their movement and then delivered to the jaw assemblies 14 of the turret 12 at a predetermined terminal velocity. The movements of the transfer carriage 66 and gate structure 72 may be correlated, each with the other, and also with the movements of the pivoted jaw fingers 32 and 34. One exemplary means for correlating the movements of the gate structure 72 with the movements of the transfer carriage 66 has been illustrated herein and will be described presently.

Still referring to FIGS. 1 to 3, inclusive, the transfer carriage 66 is comprised of two spaced apart yoke arms 100 having their lower proximate ends secured to a horizontal rock shaft 102 which extends between a pair of base supports or standards 104. A transverse tie rod 106 is connected at its ends to the yoke arms 100 and constrains these arms to move in unison. A piston and cylinder assembly 108, including a cylinder 110 and a piston 112, has the cylinder component thereof pivoted as at 114 to a fixed reaction member 116 while the piston component is provided with a piston rod 118. The outer end of the piston rod 118 is pivotally connected to the rod 106. The cylinder 110 is provided with fluid ports 126 and 128 at the opposite end regions thereof which are connected to respective fluid lines 130 and 132 (see also FIGS. 6 and 7), which, in turn, may be connected to a control valve V in a manner and for a purpose that will be made clear presently.

The yoke arms 100 are each formed with a cradle-like extensions 133 which, considered collectively, constitute a flask-receiving cradle.

The transfer carriage 66 is movable between the advanced position wherein it is disclosed in FIG. 1 and the retracted position wherein it is shown in FIG. 2. In its advanced position, the cradle 133 underlies the clamping jaw assembly 14 at the transfer station T and is in a position to receive by gravity from the jaw assembly a discharged flask. In its retracted position, the yoke arms 100 which support the cradle 133 are adapted to engage respective limit stops 134 while the cradle overlies an extreme end region of the rails 64 in such a manner that the flask carried by the cradle will be deposited on the rails 64 for subsequent tractional rolling movement of the flask along the inclined rails to the remote spinning and pouring station.

The various flasks undergoing handling by the apparatus of the present invention are designated at F, the flasks on the rails 64 and the flask undergoing transfer from the jaw assembly 14 to the cradle 133 (FIG. 1) preparatory to conduction to the rails 64 containing rammed molds M therein. The flasks F on the rails 70 and the flask undergoing transfer from the pivoted gate structure 72 to the jaw assembly 14 (FIG. 2) are empty. The flasks F are, in the main, of conventional design and each is in the form of a tubular cylindrical shell 135 having flanged ends 137 and provided with spaced medial flanges 139 which serve as centering devices for maintaining the flasks centered on the rails 66 and 70, as well as in the jaw assemblies 14. These medial flanges are adapted to straddle the rails 66 and 70 when the flasks are operatively positioned on these rails to prevent axial shifting of the flasks in either direction laterally of the rails. In the jaw assemblies 14, the medial flanges 139 serve the same purpose by straddling the sides of the jaw structure.

The jaw loading mechanism includes the previously mentioned rails and the pivoted tail gate structure 72. The gate structure 72 is comprised of a pair of spaced parallel gate fingers 136 which are connected together for movement in unison by a transverse connecting bar 150 and which are pivoted as a 151 adjacent but a slight distance inwards of their proximate ends to the end regions of the respective rails 70. The bar 150 carries an attachment lug 152 by means of which the bar may be operatively connected to an actuating piston and cylinder assembly 154. Accordingly, the cylinder 156 of the assembly 154 is pivoted as at 157 to a fixed reaction member 159. A piston 158 which is reciprocable in the cylinder 156 is connected to a piston rod 161, the outer end of which is pivotally connected as at 162 to the attachment lug 152. The cylinder is provided with fluid ports 164 and 166 which are connected through fluid lines 168 and 170, respectively, to the control valve V (FIGS. 6 and 7).

The gate fingers 136 are adapted normally to be maintained in the elevated position wherein they are shown in FIG. 1 and wherein, in effect, they constitute an upwardly inclined extension of the rails 70. These gate fingers are of arcuate design and present curved, shell-engaging surfaces which are so designed as to control the rate of travel of the flasks F therealong. The curvature which these fingers assume may vary within limits and two illustrative forms of gate fingers have been shown herein in FIGS. 4 and 5, respectively, and will be described in detail subsequently after the general operation of these gate fingers has been made clear.

When the gate fingers 136 assume their elevated positions as shown in FIG. 1, the distal ends thereof are maintained above the level of the rails 70 so that the gate member will act as a limit stop to prevent the flasks F supported on the inclined rails from running off the lower ends thereof. In the lowered positions of the fingers 136 as shown in FIG. 2, the distal ends of the latter register with the ends of the pivoted jaw fingers 32 and 34 when the latter are in their open or lowered positions so that the foremost flask F on the rails 70 may travel along the gate member and roll down the inclined curved upper edges thereof and enter the open jaw structure 14. At the same time, the extreme proximate end regions 172 of the gate fingers 136 will become slightly elevated and serve as a stop for the foremost flask F on the rails 70.

*Operation*

It has previously been explained, and reference to my copending application mentioned above will disclose, that upon each indexing operation of the turret 12 will cause an interchange of the two jaw assemblies 14 between the ramming station and the transfer station T. Movement of either jaw assembly from the transfer station T is accompanied by an upending of the empty flask F carried in such jaw assembly. Conversely, movement of either jaw assembly from the ramming station to the transfer station is accompanied by a declination of the rammed flask and the mold carried thereby. Upon arrival of either jaw assembly 14 at the transfer station, fluid is supplied to the piston and cylinder assembly through the fluid port 52 to shift the piston 50 to the right as viewed in FIG. 1 to lower the pivoted jaw fingers 32 and 34 and thus open the jaw assembly for release of the flask and mold carried thereby. At the time that such opening of the jaw assembly 14 takes place, the control valve V is manipulated in such a manner as to cause the yoke arms 100 to be swung to their fully advanced positions wherein the composite cradle 133 underlies the flask F undergoing discharge from the jaw assembly. At such time, the condition of the control valve V is such that the gate structure 72 is elevated and the row of flasks F on the rails 70 are prevented from running off the lower end of these rails.

When the parts have assumed the position just described and a flask F has been deposited in the cradle structure 133, the control valve V is manipulated to swing the jaws 66 in a clockwise direction, as viewed in FIGS. 1 and 2, and bring the cradle structure 133 into register with the adjacent end of the rails 64 whereupon the flask F resting by gravity in the cradle structure will be forcibly deposited on the rails 64 for travel therealong under the influence of gravity and whatever impetus it may receive due to its initial motion bodily with the cradle, to the remote location at the other end of the rails 63. Such manipulation of the control valve also serves to lower the gate structure 72 to the position wherein it is shown in FIG. 2 so that the distal end thereof is in register with the open jaw assembly 14. Upon such lowering of the gate structure 72, the foremost flask F resting thereon is caused to roll down the inclined curved flask-supporting surfaces of the gate fingers 136 and into the open jaws associated with the jaw structure. Thereafter, the piston and cylinder assembly 46 associated with the turret 12 is operated to effect closing movement of the jaws, after which turret indexing operations are resorted to to conduct the empty flask F to the ramming station as previously described. At such time as the next jaw assembly 14 arrives at the transfer station, the control valve V is manipulated to restore the transfer carriage 66 and gate structure 72 to their advanced positions preparatory to the next machine cycle.

The control valve V illustrated in FIGS. 6 and 7 is merely exemplary of one form of valve which may be employed for controlling the movements of the transfer carriage 66 and tail gate structure 72. Other forms of control valves may be designed for the same purpose. The valve V includes a cylindrical outer casing 200 in which there is rotatably disposed a recessed valve core 202 which operates within the inner valve chamber 204 of the casing. Motive fluid under pressure and emanating from a source S may enter the chamber 204 through an inlet port 206. Fluid may be exhausted from the chamber through an exhaust port 208. The fluid lines 132 and 170 leading from the ports 128 and 166 of the piston and cylinder assemblies 108 and 154, respectively, are connected through a T-fitting 210 and fluid line 212 to a port 216 provided in the casing 200. Similarly, the fluid lines 130 and 168 leading from the ports 126 and 164 of the piston and cylinder assemblies 108 and 154, respectively, and connected through a T-fitting 218 and fluid line 220 to a port 222 in the casing 200. The valve core 202 is recessed as at 224 and 226 at diametrically disposed regions. An additional recess is provided at 227. The casing 200 is formed with a pair of internal passage-forming channels 228 and 230, the former being in communication with the port 216. A manipulating handle 232 controls the positioning of the valve core 202.

When the manipulating handle 232 is in the position in which it is shown in FIG. 6, fluid from the source S will be admitted through the port 206 and pass through the recess 224, channel 228, port 216, fluid line 212, T-fitting 210, fluid line 132 and port 128 to the interior of the cylinder 110 so as to move the piston 112 in a direction to extend the piston rod 118 and cause the transfer carriage 66 to be moved to its advanced flask-receiving position in register with the jaw assembly 14 at the transfer station T. At the same time, the fluid will pass from the T-fitting 210 through the line 170 and port 166 in the cylinder 156 so as to move the piston 158 in a direction to extend the piston rod 161 and cause the gate structure 70 to move to its raised position. Fluid will be exhausted from the cylinders 110 and 156 through the respective fluid lines 130 and 168, and through the T-fitting 218, fluid line 220, port 222, channel 230, recess 226 and port 208.

When the manipulating handle 232 is in the position in which it is shown in FIG. 7, fluid from the source S will pass through the port 206, recess 224, port 222, fluid line 220, T-fitting 218, and fluid lines 130 and 168 to the ports 126 and 164 of the cylinders 110 and 156, respectively, to move the pistons associated therewith in a direction to reverse the positions of the transfer carriage 66 and gate structure 72. At the same time, fluid exhaust will take place from the ports 128 and 166 through the fluid lines 132 and 170, T-fitting 210, fluid line 212, port 216, recess 226 and port 208 to the atmosphere.

Referring now to FIG. 4 wherein the nature of the curvature of the flask-supporting surfaces 250 of the pivoted gate fingers 136 has been diagrammatically portrayed, each surface presents an involute curve of gradually diminishing radius extending from the proximate end region or stop 172 to the extreme distal end 252 of the finger. The proximate end region 172 is formed with a straight edge section 254 which assumes a vertical position when the finger is lowered as shown in dotted lines and a horizontal position when the finger is raised as shown in full lines. This flat section 254 retains the cylindrical shell portion of the flask F thereon immediately prior to lowering of the finger. From the above description, it will be seen that if the gate structure is lowered at a constant rate of speed, the foremost flask F on the rails 70 will encounter a relatively sharp initial drop-off, after which it will gradually be restained in its forward velocity and will finally move over the extreme distal ends 252 of the gate fingers 136 at a predetermined relatively low velocity, the value of which may be controlled by the rate of lowering of the gate structure.

In FIG. 5 there has been disclosed a gate structure wherein the gate fingers 136a are caused to present an approximate involute curvature by the expedient of machining or otherwise forming different sections of the flask-supporting edges 250a on different radii. By such an arrangement, substantially the same decelerating effect on the flasks F undergoing feeding to the jaw assemblies 14 may be obtained with a considerable saving in the cost of manufacture of the fingers. For exemplary purposes, the curved surface 250a has been machined on three different radii from three different centers C, $C_2$ and $C_3$ shown at R1, R2 and R3, the corresponding sections being designated at S1, S2 and S3. The radius R1 is relatively long while the radius R3 is relatively short. The radius R2 is of an intermediate length. It has been found that three such diminishing radii are sufficient to effect the desired decelerating effect on the rolling flasks F, but, if desired, additional diminishing radii may be employed.

The invention is not to be limited to the exact arrangement of parts shown in the accompanying drawings or described in this specification as various changes in the details of construction may be resorted to without departing from the spirit of the invention. Only insofar as the invention has particularly been pointed out in the accompanying claims is the same to be limited.

Having thus described the invention what I claim as new and desire to secure by Letters Patent is:

1. In a foundry installation, the combination with a transfer device having a jaw cradle movable into a flask-receiving and a flask-discharging position at a transfer station, of flask-handling mechanism for delivering empty flasks from a first remote location to said cradle and for delivering mold-containing flasks from said cradle to a second remote location, of a first ramp extending between the transfer station and the first location, a second ramp extending between the transfer station and the second location, said first ramp being inclined away from the first location and toward the transfer station for conduction of empty flasks from said first location to the transfer station by a rolling action under the influence of gravity, said second ramp being inclined away from the transfer station and toward the second location for conduction of mold-containing flasks from said transfer station to said second location by a rolling action under the influence of gravity, a gate structure pivotally mounted intermediate its ends and adjacent to one end thereof on said first ramp for swinging movement about a horizontal axis adjacent to the lower end of the first ramp and having a traction surface thereon, said gate structure being movable between a raised position wherein the traction surface constitutes, in effect, a forward and upward extension of the first ramp and a lowered position wherein it constitutes, in effect, a forward and downward extension of the first ramp with the distal end of such extension in register with the jaw cradle for delivery of empty flasks to said jaw cradle, a flask-transporting carriage at said transfer station for receiving mold-containing flasks from said jaw cradle and delivering the same to said second ramp for conduction thereby to said second remote location, said carriage being pivoted at its lower end and below the level of both said jaw cradle and said second ramp for oscillating movements about a fixed axis, an upwardly facing open flask-receiving cradle at the upper free end of said carriage, said carriage being movable between an advanced position wherein said open flask-receiving cradle underlies and is in vertical register with said jaw cradle, and a retracted position wherein said open flask-receiving cradle overlies and is in register with the upper end of said second ramp, means for moving said gate structure and carriage in timed relation to each other whereby the gate structure is in its raised position when the carriage is in its advanced position and whereby the gate structure is in its lowered position when the carriage is in its retracted position, a portion of said gate structure adjacent to said one end thereof normally lying below the level of the path of movement of the empty flasks on said first ramp when the gate structure is in its raised position and assuming a position above such level and directly in the path of movement of the flasks when the gate structure is in its lowered position, and a limit stop positioned in the path of movement of said carriage and engageable with the latter for establishing the retracted position of the carriage whereby, upon termination of the movement of the carriage toward its retracted position, a flask carried thereby will be forcibly ejected from the open cradle under the influence of its own momentum and deposited on the upper end of said second ramp.

2. In a foundry installation, the combination set forth in claim 1 and wherein the end of the second ramp at the transfer station underlies the end of the first ramp at the transfer station, wherein the level of the end of the first ramp at the transfer station is above the level of the jaw cradle, and wherein the level of the end of the second ramp at the transfer station is below the level of the jaw cradle.

References Cited in the file of this patent

UNITED STATES PATENTS

| | | |
|---|---|---|
| 1,794,424 | Smith et al. | Mar. 3, 1931 |
| 1,901,360 | Snow | Mar. 14, 1933 |
| 2,710,104 | Putnam | June 7, 1955 |